United States Patent Office 3,055,950
Patented Sept. 25, 1962

3,055,950
MANUFACTURE OF TRICHLOROPHENOLS
Elmer A. Fike, Nitro, W. Va., and William H. Seaton, Kingsport, Tenn., assignors to Monsanto Chemical Company, St. Louis, Mo., a corporation of Delaware
No Drawing. Filed Sept. 4, 1959, Ser. No. 838,045
1 Claim. (Cl. 260—623)

The present invention relates to the manufacture of trichlorophenols and particularly to the manufacture of trichlorophenols by the hydrolysis of tetrachlorobenzenes. As obtained in the process hereinafter described, the phenols are in the form of sodium salts from which the phenols themselves are produced by well-known processes. High conversion of the reactants are realized under the conditions described in the examples of the invention.

Trichlorophenols have been extensively manufactured by alkaline hydrolysis of tetrachlorobenzenes but the results have not been as uniform as desired. The ratio of actual to theoretical conversion varied considerably and varying content of side reaction products resulted. Moreover, heating the reactants at the temperatures required for hydrolysis occasionally gave an uncontrollable reaction. There was then built up dangerously high pressure and carbonization took place in the reactor. The residues from the decomposition were extremely toxic and more than 100 cases of chloracne resulted from a single uncontrollable reaction. These difficulties have been encountered by hydrolysis within the range of 165–180° C. regardless of the solvent employed. It is customary to employ an alcoholic reaction medium, generally methyl alcohol, ethylene glycol, or propylene glycol. This invention is particularly concerned with improvements in the alkaline hydrolysis in tetrachlorobenzenes in alcoholic reaction medium.

Although decomposition and side reaction imposed limitations, high operating temperatures would be otherwise desirable for achieving short reaction time cycles. It was discovered, however, that high conversion to trichlorophenol was uniformly effected in short time by feeding the reactants under superimposed pressure sufficient to effect uniform flow to a hot reaction zone of a tubular reactor. The cross section of the reactor will depend upon the rate of production desired and is desirably but not necessarily within limits that permit turbulent flow through the system. Efficient heat transfer is important because the relationship between temperature and time of exposure is most critical. Feeding the reactants to a tubular reactor effects efficient heat transfer whereby the inherently uncontrolled variables of prior procedures introduced by heating a large mass to reaction temperature and then cooling are reduced to a minimum. Heat-up and cool-down times become negligible with respect to on-temperature time.

Preferably the reaction zone is maintained at about 190–220° C. At 250° C. tar formation becomes excessive. The reactants in alcoholic medium and in homogeneous admixture are fed to the hot reaction zone and maintained therein for a period of 40–55 minutes. The preferred ratio of sodium hydroxide is within the range of 2.2–3 molecular weight proportions per molecular weight proportion of tetrachlorobenzene. After a residence time of 40–55 minutes the products are continuously withdrawn from the hot reaction zone. The rate of flow of the reactants through the reaction chamber regulates the time of exposure of the reactants to heat.

The equipment suitable for use in the preferred process is relatively simple. A high pressure feed pot, comprising for example a two gallon, agitated, gas heated iron autoclave, was connected to 36 feet of 5/16 inch I.D. stainless steel tube that was tromboned up and down within an 8 inch steel cylinder. The tubes were held on temperature by suitable means, as for example by Aroclor (a chlorinated biphenyl) which was circulated through the steel shell and maintained at the desired temperature by a thermostatically controlled electric heater. The reaction system was maintained in the liquid phase by nitrogen pressure which was applied to the surface of the slurry in the feed pot. The slurry was pre-heated to effect a uniform mixture but kept below the temperature at which formation of trichlorophenol takes place and then passed through the hot tubular reaction zone. There was no tar formation at the tube walls although the dimensions allow only laminar flow instead of the more desirable turbulent flow. No plugging of the tube was experienced. The process is readily understood from the following examples.

EXAMPLE 1

A charge comprising 1 molecular weight of 1,2,4,5-tetrachlorobenzene (216 parts), 260 parts by weight of methanol and 102 parts (2.5 moles) of commercial grade 98% caustic soda was added to the feed pot. After the reaction tube mentioned had been filled with methanol and the valves respectively at the exit end of the tube and between the feed pot and the tube had been closed, the charge was heated to 140° C. Homogeneous mixture of tetrachlorobenzene, caustic and methanol forms at 140–150° C. The chlorinated biphenyl (Aroclor) in the jacket of the shell enclosing the tromboned reactor tube was then heated to a temperature between 190–220° C. by electrical heating means. As soon as the beforementioned reaction temperature was reached, pressure was applied to the feed pot to 800 pounds per square inch of nitrogen from a nitrogen cylinder and the flow rate of material therethrough regulated by throttling the valves. The valves were regulated to develop a residence period for the reactants in the pressure tube of between 40 and 55 minutes. Continuous flow of the reaction mixture was provided by means of a second feed pot connected in the system and alternating the use of it with the first feed pot as the contents of each were used up. The product from the reaction tube was collected after releasing the superimposed pressure therefrom and off gas passed through a condenser to remove methanol. The residue remaining was treated with sufficient water to produce a thin slurry and the alkali insoluble material removed by filtration. The diluted filtrate was then neutralized with approximately 23% sulfuric acid and agitated and the trichlorophenol precipitated. This was filtered, reslurried with water to remove all free acid, filtered and dried by suitable means to obtain 2,4,5-trichlorophenol in yields above 97% in every case. The percent conversion was calculated by dividing the weight of trichlorophenol by the total weight of solids recovered for the run.

The results from several runs carried out as described above follow:

Table 1

| Percent Molar Excess NaOH | Reaction Temperature, °C. | Residence Time in Minutes | Mole Percent Conversion |
| --- | --- | --- | --- |
| 25 | 190 | 51.7 | 96.1 |
| 25 | 203 | 41.5 | 95.5 |
| 25 | 201 | 54.3 | 100.0 |
| 25 | 199 | 35.0 | 73.2 |
| 50 | 190 | 54.3 | 98.3 |

While 25% excess caustic soda is about optimum, the ratio can vary and the yields are not much different providing at least 10% excess is used. Completely anhydrous methanol is unnecessary although water tends to decrease conversion and increase tars. However, the hydrolysis of tetrachlorobenzene has been successfully conducted with up to 10% water in the methanol. The formation of trichlorophenol is the limiting reaction. Trichloroanisole forms rapidly at 140° C. and the results were the same whether the reactants were heated rapidly to 140° C. and fed to the high temperature zone immediately or kept at 140° C. for prolonged periods.

It is intended to cover all changes and modifications of the examples of the invention herein chosen for purposes of disclosure which do not constitute departures from the spirit and scope of the invention.

This application is a continuation-in-part of application Serial No. 617,279, filed October 22, 1956, now abandoned.

What is claimed is:

A process for the manufacture of 2,4,5-trichlorophenol which comprises feeding under conditions of efficient heat transfer to a preheated reaction zone maintained at 190–220° C. a homogeneous mixture at 140–150° C. in methanol of 1,2,4,5-tetrachlorobenzene and sodium hydroxide in the ratio of one molecular weight of 1,2,4,5-tetrachlorobenzene and 2.2–3.0 molecular weights of sodium hydroxide, causing the mixture to traverse a path whereby it is maintained at 190–220° C. for 40–55 minutes under superimposed pressure which effects uniform flow through the reaction zone and then withdrawing product from the hot reaction zone thereby obtaining conversion to sodium 2,4,5-trichlorophenate above 80%.

References Cited in the file of this patent

UNITED STATES PATENTS

| | | |
|---|---|---|
| 2,232,674 | Pyzel | Feb. 18, 1941 |
| 2,509,245 | Nikawitz et al. | May 30, 1950 |
| 2,803,670 | Galat | Aug. 20, 1957 |

(Div. of application filed Nov. 12, 1952)